United States Patent
Qin

(10) Patent No.: US 10,442,070 B2
(45) Date of Patent: Oct. 15, 2019

(54) HAND-HELD ELECTRIC TOOL

(71) Applicant: Guicai Qin, Wuxi (CN)

(72) Inventor: Guicai Qin, Wuxi (CN)

(73) Assignee: Guicai Qin, Wuxi New District, Jiangshu (CN)

( * ) Notice: Subject to any disclaimer, the term of this patent is extended or adjusted under 35 U.S.C. 154(b) by 2 days.

(21) Appl. No.: 15/579,218

(22) PCT Filed: Jun. 3, 2016

(86) PCT No.: PCT/CN2016/084655
§ 371 (c)(1),
(2) Date: Dec. 4, 2017

(87) PCT Pub. No.: WO2016/202178
PCT Pub. Date: Dec. 22, 2016

(65) Prior Publication Data
US 2018/0178368 A1   Jun. 28, 2018

(30) Foreign Application Priority Data
Jun. 15, 2015   (CN) .......................... 2015 1 0336689

(51) Int. Cl.
*B25F 5/00* (2006.01)
*F16H 21/52* (2006.01)

(52) U.S. Cl.
CPC .............. *B25F 5/006* (2013.01); *B25F 5/00* (2013.01); *B25F 5/008* (2013.01); *F16H 21/52* (2013.01)

(58) Field of Classification Search
CPC .................. B25F 5/006; B27B 19/006
See application file for complete search history.

(56) References Cited

U.S. PATENT DOCUMENTS 3,554,197 A * 1/1971 Dobbie .................. B23Q 5/027
                                                                    30/392
2014/0299345 A1* 10/2014 McRoberts ........... B24B 23/043
                                                                    173/162.2

FOREIGN PATENT DOCUMENTS

| CN | 101044340 A | 9/2007 |
| CN | 102294653 A | 12/2011 |
| CN | 102441873 A | 5/2012 |
| CN | 202344612 U | 7/2012 |
| CN | 102672687 A | 9/2012 |
| CN | 202668512 U | 1/2013 |
| CN | 104889944 A | 9/2015 |
| WO | 2009112099 A1 | 9/2009 |

* cited by examiner

*Primary Examiner* — Michael C McCullough
(74) *Attorney, Agent, or Firm* — Guicai Qin

(57) ABSTRACT

Disclosed is a hand-held electric tool, in which a main shaft (1) swings back and forth around an axis (11) to drive accessories (9) of the tool to carry out various types of operations. A swing device is provided with an eccentric element (41) capable of reducing the shock caused to a shell (7) by a connecting rod component (3). Another shell (6) is provided with a valve device (5) used for adjusting the flow of air current in different air ducts. The accessories (9) of the tool can be cooled or cleaned through the air current in one of the air ducts. The main shaft (1) is provided with an elastic support (2) used for balancing the load when an electrical motor (8) is operating. The elastic support (2) can replace a bearing in supporting the main shaft (1) swinging back and forth around the axis (11).

2 Claims, 5 Drawing Sheets

Profile A-A

ID TOOL

CROSS-REFERENCE TO RELATED APPLICATION

This application is national application of PCT/CN2016/084655, filed on Jun. 3, 2016. The contents of PCT/CN2016/084655 are all hereby incorporated by reference.

FIELD OF THE INVENTION

The present invention relates to a hand-held electric tool, especially a hand-held electric tool with a main shaft that oscillates reciprocally around an axle center thereof to drive tool accessories for various operations.

BACKGROUND OF THE INVENTION

A hand-held electric tool with a main shaft that oscillates reciprocally around an axle center thereof to drive tool accessories for various operations has been extensively applied in a variety of fields. Such hand-held electric tool includes a housing, a motor, an oscillator device and a main shaft. Usually, the oscillator device of the electric tool has an axle center and a crank component (eccentric shaft) that is parallel to an axle center of a crank arm. A spherical bearing on the crank arm is connected with a connecting rod component (oscillating bar) through a sliding pair. Sliding friction between the crank component and the connecting rod component of the hand-held electric tool generates lots of heat to result in low mechanical efficiency. A cutter is easily heated when the hand-held electric tool cuts, especially cuts a metal material for a long time. Moreover, high temperature is transferred to the main shaft and the housing to lead to improper operation, even danger. Due to failure of a dust-proof component, the hand-held electric tool easily causes reduction of the efficiency of a bearing supporting the main shaft, even failure. Many technology improvement schemes for the electric tool are provided in this industry, but there are still some shortcomings.

SUMMARY OF THE INVENTION

The present invention aims to put forward a technical solution to overcome various shortcomings of the prior art, so as to provide a hand-held electric tool with advantages of high deficiency and energy saving, convenience and comfort, and safety and reliability.

Technical solution 1 put forward by the present invention is as follows: a hand-held electric tool, comprising a housing, a motor, an oscillator device and a main shaft, the main shaft oscillates reciprocally around an axle center thereof to drive tool accessories for various operations: wherein the oscillator device is provided with a crank component having its axle center forming an angle of no greater than 30° with an axle center of a crank arm, the axle center of the crank component, the axle center of the crank arm and the axle center of the main shaft are intersected at the same point, and an intersection angle between the axle center of the crank component and the axle center of the main shaft is fixed to 70°-110°; the oscillator device is provided with a connecting rod component connected with the main shaft, another end of the connecting rod component is rotationally connected with the crank component around the axle center of the crank arm, and the connecting rod component rotates around an axis vertical to the axle center of the main shaft and intersected with the axle center of the crank component within the scope of an angle twice as large as an intersection angle of the axle center of the crank component and the axle center of the crank arm; the oscillator device is provided with an eccentric component fixedly connected with the crank component, the eccentric component can alleviate vibration on the housing when the crank component and the connecting rod component rotate around the axle center of the crank component.

In an attempt to alleviate vibration on the housing by the crank component, one eccentric component is generally applied on the hand-held electric tool of the crank component, the axle center of which is parallel to that of the crank arm thereof, but the eccentric component cannot alleviate vibration on the shell by the connecting rod component. For the purpose of reducing rotary inertia when the connecting rod component rotates around the axle center of the main shaft, a part, that is in contact with a spherical bearing in the crank component, of the connecting rod component is designed to be light and small, and accordingly, the mechanical intensity of the connecting rod component is reduced, and the output power of the electric tool is also constrained. The patent application CN201310057785 discloses a multi-functional electric tool with an axle center intersected with an axle center of the crank arm thereof, wherein an intersection angle between the axle center of the crank component and the axle center of the main shaft is not fixed, and the oscillator device is not provided with any component for shock absorption. When the intersection angle between the axle center of the main shaft and the axle center of the crank arm is greater than 150° or less than 30°, self-locking of a movement mechanism will appear in the multi-functional electric tool; when the crank component and the connecting rod component rotate around the axle center of the crank component at a high speed, the housing vibrates greatly. Compared with the prior art, the hand-held electric tool, provided by the technical solution 1 put forward by the invention, is high in mechanical efficiency, low in housing vibration, and high in output power.

Technical solution 2 put forward by the present invention is as follows: a hand-held electric tool, comprising a housing, a motor, an oscillator device and a main shaft, the main shaft oscillates reciprocally around an axle center thereof to drive tool accessories for various operations: wherein the housing is provided with a valve device capable of selectively guiding positive pressure air current generated by rotation of blades of a motor to be discharged through different air ducts; the air ducts are spaces having air current inlets and air current outlets provided in the housing, and the positive air current discharged by one of the air ducts is guided to the corresponding tool accessory for cooling or cleaning up.

In the prior art, air current generated by rotation of blades of the motor only plays a role in cooling parts within the housing of the hand-held electric tool only. In comparison with the prior art, the hand-held electric tool, provided by the technical solution 2 put forward by the invention, repeatedly applies positive air current caused by rotation of the blades of the motor to cool or clean up the tool accessories, thereby not only avoiding safety hazards resulted from high temperature generated by the tool accessories, but also improving operation efficiency.

Technical solution 3 put forward by the present invention is as follows: a hand-held electric tool, comprising a housing, a motor, an oscillator device and a main shaft, the main shaft oscillates reciprocally around an axle center thereof to drive tool accessories for various operations: wherein the main shaft is provided with an elastic support, the elastic support is provided with an inner ring and an outer ring respectively and fixedly connected with the main shaft and the housing, the elastic support is further provided with a plurality of elastic components fixedly connected with the inner ring and the outer ring; the main shaft will receive torsional elastic force applied by the elastic support while oscillating around the axle center thereof, an angular speed is maximum when the torsional elastic force received by the main shaft is zero, and an angular speed is zero when the torsional elastic force received by the main shaft is maximum.

In the prior art, when the main shaft of the hand-held electric tool oscillates circularly around the axle center thereof to drive the tool accessories for operation, the motor load will fluctuate as the angle speed of the main shaft varies, thereby leading to reduction of the motor efficiency and shortening of life. Compared with the prior art, the hand-held electric tool, provided by the technical solution 3 put forward by the invention, can balance loads of the motor when the motor operates, so as to improve efficiency and life of the motor.

Technical solution 4 put forward by the present invention is as follows: a hand-held electric tool adopted the technical solution 1 put forward by the invention: wherein the centrifugal force, produced by the eccentric element and the crank component as a whole going around the axle center of the crank component, is equal to the force produced by the connecting rod component going around the axle center of the crank component, while its direction is in opposition.

The hand-held electric tool, provided by the technical solution 4 put forward by the invention, can make the vibration intensity of the housing as low as possible.

Technical solution 5 put forward by the present invention is as follows: a hand-held electric tool adopted the technical solution 4 put forward by the invention: wherein any cross section center of the connecting rod component perpendicular to the axle center of the crank arm is at the axle center of the crank arm; when the connecting rod component, the crank component and the eccentric element move as a whole, its barycenter locates on the axle center of the crank component.

The hand-held electric tool, provided by the technical solution 5 put forward by the invention, can easily measure the moment of inertia of the connecting rod component going around the axle center of the crank, which makes it easier to design electric tools and lowers the manufacturing cost of spare part.

Technical solution 6 put forward by the present invention is as follows: a hand-held electric tool adopted the technical solution 1 put forward by the invention: wherein the connecting rod component is provided with an elastic element and connected with the main shaft fixedly; the elastic element around an axle that is perpendicular to the axle center of the main shaft and intersects with the axle center of the crank component can produce bending deformation bigger than the intersection angle between the axle center of the crank component and that of the crank arm; the elastic element around the axle center of the main shaft cannot produce bending deformation bigger than the intersection angle between the axle center of the crank component and that of the crank arm.

The hand-held electric tool, provided by the technical solution 6 put forward by the invention, can diminish the influence made by the machining tolerance and the assembly error and reduce the noise caused by flexible connection.

Technical solution 7 put forward by the present invention is as follows: a hand-held electric tool adopted the technical solution 6 put forward by the invention: wherein the angle of intersection between the axle center of the crank component and that of crank arm is no more than 5°; the main shaft is provided with elastic support; the elastic support is provided with inner ring and outer ring fixedly connected with the main shaft and the housing separately ; the elastic support is also provided with several elastic elements, which fixedly connect the inner ring and the outer ring; when the main shaft oscillates around the axle center, the elastic support will exert torsion spring on the main shaft; when the axle centers of the crank component, the crank arm and the main shaft are on the same plane, the torsion spring exerted by the elastic support on the main shaft is zero.

The hand-held electric tool, provided by the technical solution 7 put forward by the invention, not only can diminish the influence made by the machining tolerance and the assembly error to the electrical tool, reduce the noise caused by flexible connection and extend the service life of bearings, but also maintain the balance on the load of the motor. Therefore, the efficiency of the motor can be enhanced.

Technical solution 8 put forward by the present invention is as follows: a hand-held electric tool adopted the technical solution 2 put forward by the invention: wherein the valve system is provided with a control valve; the control valve is provided with a diversion port, docking with the airflow inlet; the adjustment of the relative position between the diversion port and the airflow inlet can help adjust the airflow of the airflow outlet.

The hand-held electric tool, provided by the technical solution 8 put forward by the invention, can cool or clean accessories of the tool by conveniently using fan blades of the motor.

Technical solution 9 put forward by the present invention is as follows: a hand-held electric tool adopted the technical solution 2 put forward by the invention: wherein the housing is provided with diversion element that can adjust the direction and the diversion element is provided with an airflow outlet of accessories of the tool, to which the direction of airflow is over against.

The hand-held electric tool, provided by the technical solution 9 put forward by the invention, can cool or clean accessories of the tool by conveniently using fan blades of the motor.

Technical solution 10 put forward by the present invention is as follows: a hand-held electric tool adopted the technical solution 10 put forward by the invention: wherein in place of the bearing, the elastic support sustains the main shaft that goes around the axle center to oscillate back and forth.

The hand-held electric tool, provided by the technical solution 10 put forward by the invention, can diminish the harmful influence made by the failure of dustproof elements to the electrical tool, and also it can slow down the vibration of the housing caused by the main shaft suffering from the radial impact.

Among hand-held electric tools provided by the technical solution 1 put forward by the invention, the angle of intersection between the axle center of the crank component and that of the main shaft is fixed as 90°, which would be the most optimal.

Among hand-held electric tools provided by the technical solutions 7 and 10 put forward by the invention, the elastic support can be unibody or assembled by using many spare parts. The elastic element can be made from metal material or other elastic materials.

Above all, it is achievable to provide a hand-held electric tool featuring high-efficiency, energy-saving, convenient, comfortable, safe and reliable through adopting one or more technical solutions put forward by the present invention.

Figure 1:
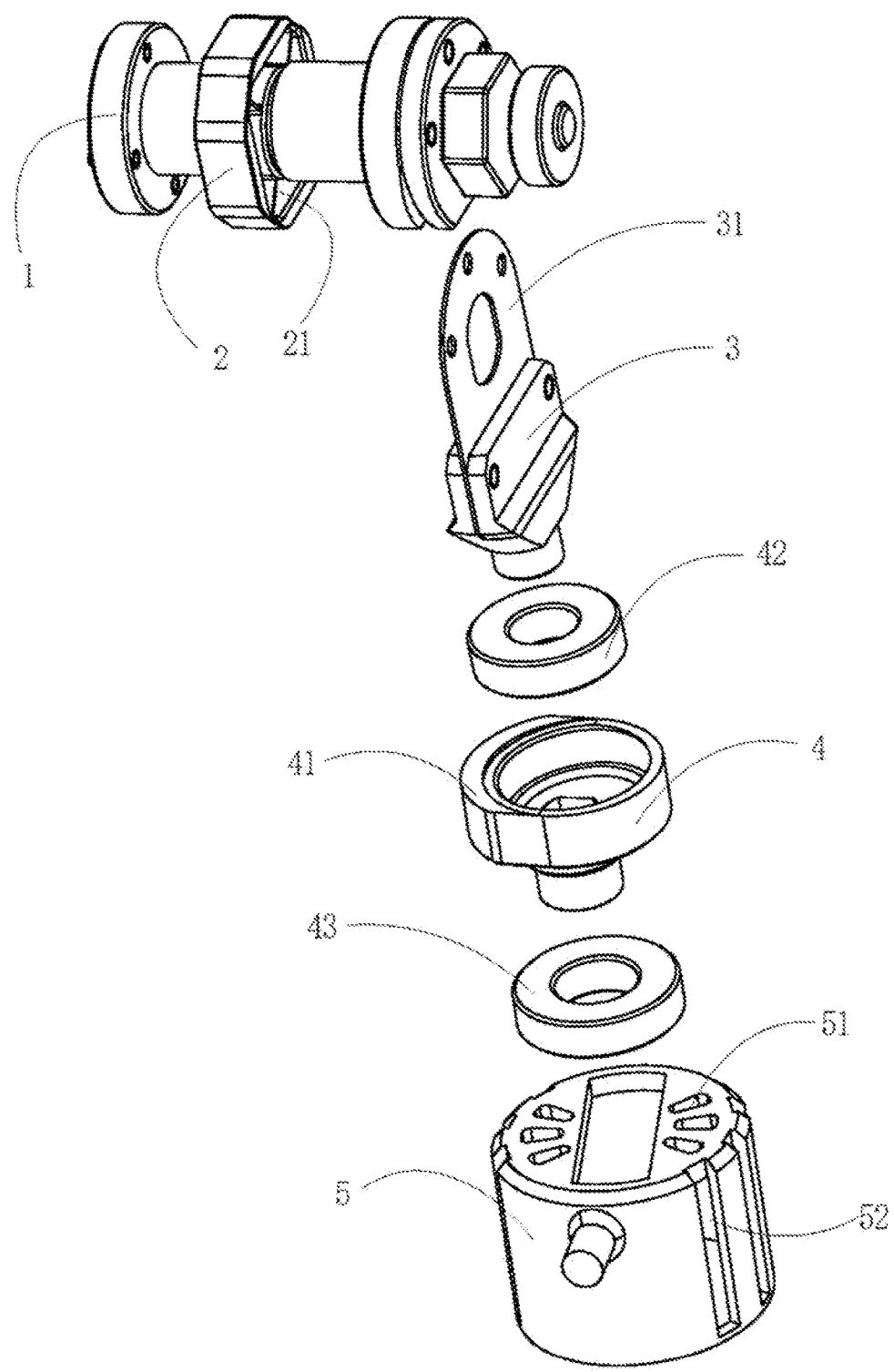
FIG. 1 illustrates the isometric projection of main parts of the embodiment provided by the present invention.
Figure 2:
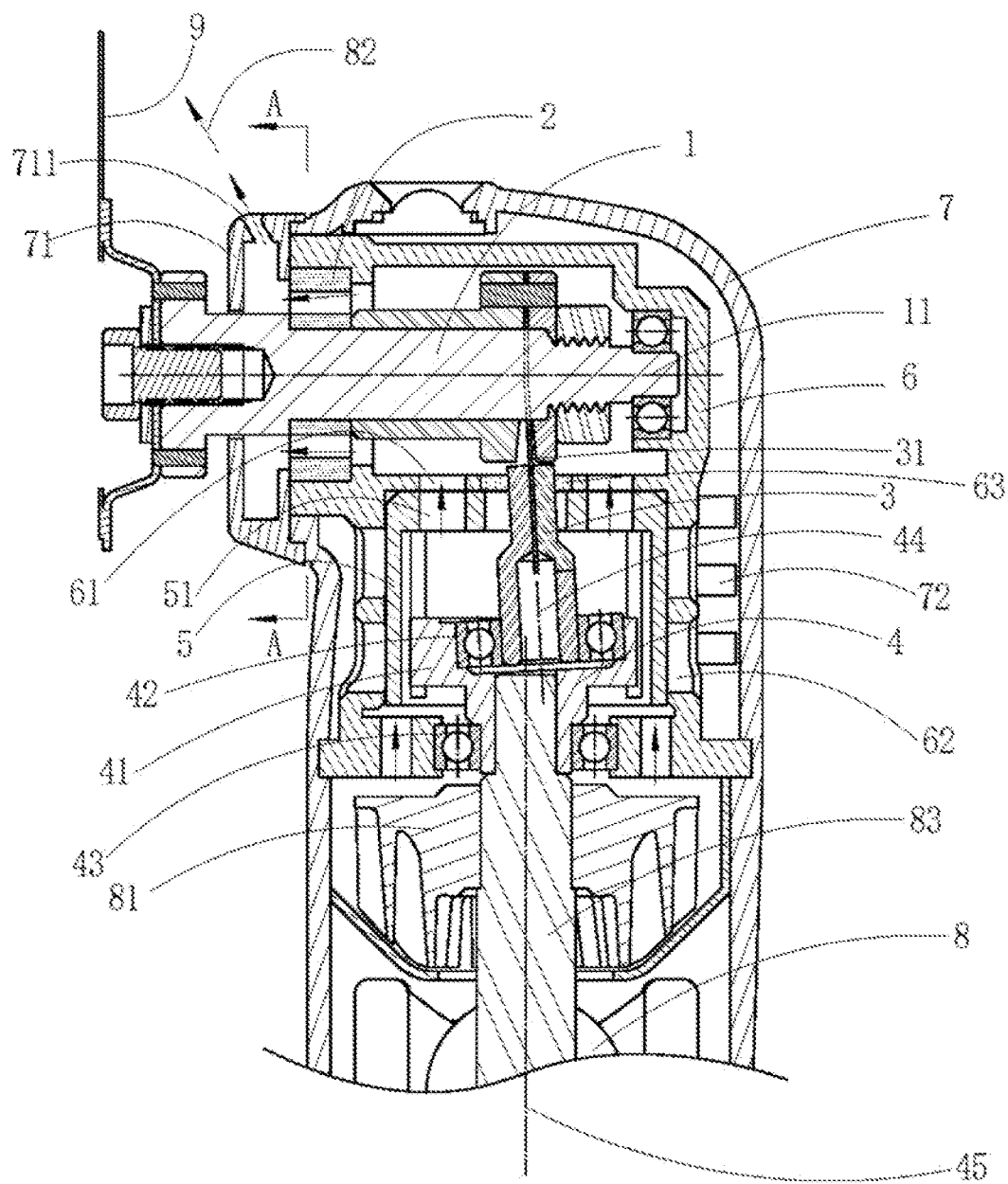
FIG. 2, FIG. 3 and FIG. 4 illustrate the diagrammatic cross-section of the first embodiment provided by the present invention.
Figure 3:
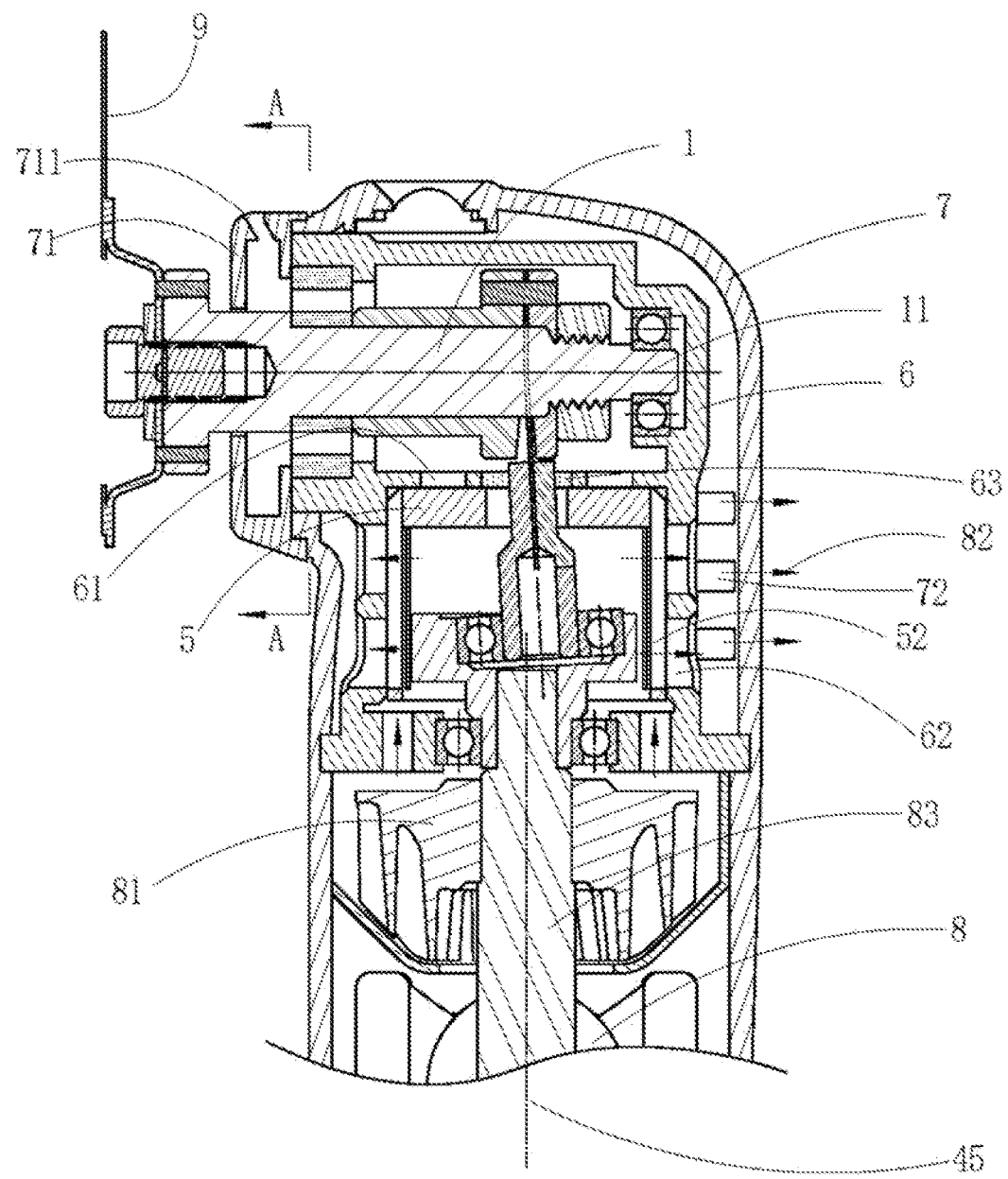
Figure 4:
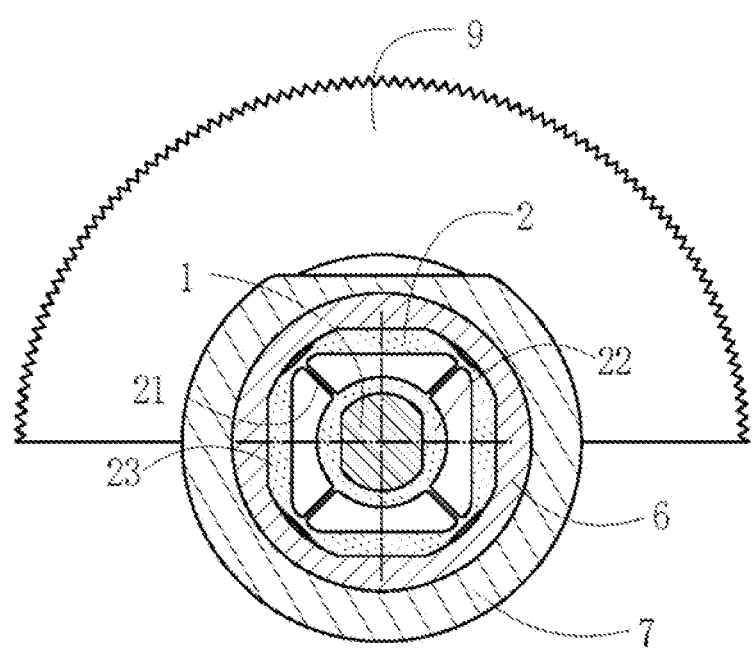

The numbered list of the relevant elements and technical features is as following:

| 1 | Main shaft | 11 | Axle center | 2 | Elastic support |
|---|---|---|---|---|---|
| 21 | Elastic element | 22 | Inner ring | 23 | Outer ring |
| 3 | Connecting rod component | 31 | Elastic element | 4 | Crank component |
| 41 | Eccentric element | 42 | Bearing | 43 | Bearing |
| 44 | Axle center | 45 | Axle center | 5 | Control valve |
| 51 | Diversion port | 52 | Diversion port | 6 | Housing |
| 61 | Airflow inlet | 62 | Airflow inlet | 63 | Elastomer seal |
| 7 | Housing | 71 | Diversion element | 711 | Airflow outlet |
| 72 | Airflow outlet | 8 | Motor | 81 | Fan blade |
| 82 | Positive pressure airflow | 83 | Motor shaft | 9 | Tool accessory |

DESCRIPTION OF THE PREFERRED EMBODIMENTS

The invention is further illustrated in combination with drawings and the preferred embodiment:

As shown in FIGS. 1, 2, 3 and 4:

A crank component 4 having its axle center 45 forming an angle of 2° with the axle center 44 of the crank arm is provided for the preferred embodiment. The axle center 45 of crank component 4, the axle center 44 of crank arm and the axle center 11 of main shaft 1 intersect at a same point, and the intersection angle between the axle center 45 of crank component 4 and the axle center 11 of main shaft 1 is fixed at 90°. A connecting rod component 3 connecting with the main shaft 1 is provided as well. The other end of the connecting rod component 3 is rotatably connected with the crank component 4 around the axle center 44 via a bearing 42. The connecting rod component 3 can turn within a range not smaller than 4° around an axis which is perpendicular to the axle center 11 and intersects with the axle center 45. The crank component 4 is provided with a bearing 43 which is rotatably connected with a housing 6, the crank component 4 is securely connected with a motor shaft 83 at a same axle center in the meantime, and the housing 6 is securely connected with a housing 7. When the motor 8 drives the crank component 4 to rotate continuously, the connecting rod component 3 drives the main shaft 1 to swing around the axle center 11 within a range of 4°.

In the preferred embodiment, an eccentric element 41 is provided integrally with the crank component 4. The connecting rod component 3 has a symmetrical shape with the center lying on the axle center 44, and the centroid of the moving whole consisted of the connecting rod component 3, the crank component 4 and the eccentric element 41 is lain on the axle center 45. The centrifugal force generated by a rotating connecting rod component 3 around the axle center 45 is equal to and has a contrary direction with that generated by the crank component 4 with the eccentric element 41, bringing a milder vibration to the housing 7.

In the preferred embodiment, the connecting rod component 3 is provided with an elastic component 31 which is a sheet metal body. When the connecting rod component 3 rotates around the axle center 45, the elastic component 31 can generate a bending deformation greater than 2° around an axis which is perpendicular to the axle center 11 and intersects with the axle center 45, and the bending deformation of the elastic component 31 around the axle center 11 is small enough to be ignored. Noise produced by the movable connection can be avoided through the secure connection between the connecting rod component 3 and the main shaft 1 via the elastic component 31, and the elastic component 31 can generate an adaptive elastic deformation due to the motion dislocation of the component, thereby reducing the adverse effects caused by machining tolerance and assembly error.

In the preferred embodiment, the main shaft 1 is provided with an elastic support 2. The elastic support 2 is provided with an inner ring 22 and an outer ring 23 which are respectively securely connected with the main shaft 1 and the housing 7, and is provided with 4 elastic components 21 which are securely connected with the inner ring 22 and the outer ring 23 as well. When the axle center 45 of crank component 4, the axle center 44 of crank arm and the axle center 11 of main shaft 1 lie in a same plane, no elastic deformation of the elastic components 21 is generated in the transverse direction of the main shaft 1. When the main shaft 1 swings back and forth around the axle center 11, the elastic components 21 will generate bending deformation and tensile deformation in the transverse direction of the axle center 11, and the main shaft 1 will be subject to the torsional elasticity imposed by the elastic support 2. The angular velocity is the maximum when the torsional elasticity imposed on the main shaft 1 is zero, and the angular velocity is zero when the main shaft 1 is subject to a maximum torsional elasticity. During operation, the load of motor 8 is directly proportional to the torsional elasticity imposed on the main shaft 1 and to the angular velocity of the main shaft 1, such that the elastic support 2 can balance the load of the motor 8. When the main shaft 1 is subjected to a radial external force, a slight displacement of the axle center 11 with respect to the housing 6 will occur, and the vibration caused can be buffered. With adopting the elastic support 2 as the support of the main shaft 1 instead of a bearing, the noise produced by the movable connection, as well as the adverse consequences caused by the bearing grease failure due to the scraper seal failure, can be avoided.

In the preferred embodiment, the housing 6 is provided with airflow inlets 61 and 62, an elastomer seal 63 and a regulating valve 5, and the regulating valve 5 is provided with diversion ports 51 and 52 which are respectively butted with the airflow inlets 61 and 62. A diversion element 71 and an airflow outlet 72 are provided on the housing 7, and an airflow outlet 711 is provided on the diversion element 71. The diversion element 71 can adjust angle around the axle center 11 to face the airflow outlet 711 directly to the tool accessory 9.

In this preferred embodiment, following effects can be achieved by adjusting the angle of the regulating valve 5 around the axle center 45: The diversion port 51 and the airflow inlet 61 are connected while the diversion port 52 and the airflow inlet 62 are closed, then the positive pressure airflow 82 produced by the rotating fan blade 81 of the motor 8 is vented through the airflow outlet 711, and the airflow outlet 711 directly faces the tool accessory 9, such that the tool accessory 9 can be cooled or cleaned; the diversion port 51 and the airflow inlet 61 are closed while the diversion port 52 and the airflow inlet 62 are connected, then the positive pressure airflow 82 produced by the rotating fan blade 81 of the motor 8 is vented through the airflow outlet 72; the diversion port 51 and the airflow inlet 61 together with the diversion port 52 and the airflow inlet 62 are connected, then the positive pressure airflow 82 produced by the rotating fan blade 81 of the motor 8 is respectively vented through the airflow outlets 711 and 72; in order to ensure the effective cooling of the motor 8, the diversion port 51 and the airflow inlet 61 will not be closed simultaneously with the diversion port 52 and the airflow inlet 62.

Figure 5:
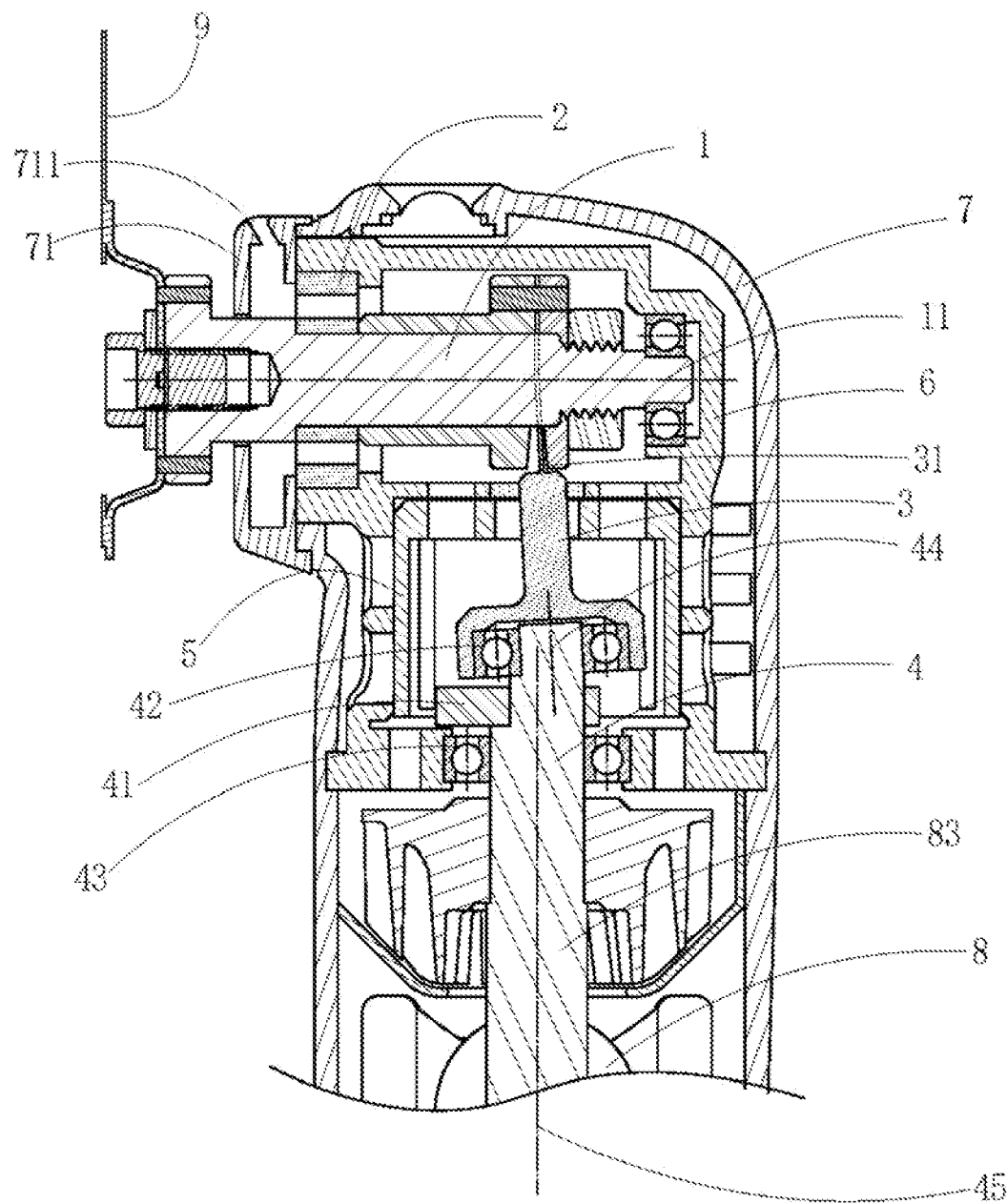
FIG. 5 illustrates the diagrammatic cross-section of alternative solution of the embodiment provided by the present invention.

There can be multiple alternatives to some technical features of the preferred embodiment: As shown in FIG. 5, the crank component 4 is integrated with the motor shaft 83, the eccentric element 41 is securely connected on the crank component 4, and the connecting rod component 3 is integrally molded with elastic material. Similar alternatives have no substantial influence on the implementation effect of this embodiment.

The detailed description and drawings are merely illustrative of the invention, rather than limiting the scope of the invention being defined by appended claims and equivalent thereof. A person skilled in the art can make nonessential changes to some technical features based on the technical proposals put forward in the invention, so as to obtain other embodiments.

The invention claimed is:

1. A hand-held electric tool, comprising a housing, a motor, an oscillator device and a main shaft, the main shaft oscillates reciprocally around an axle center thereof to drive tool accessories for various operations: wherein the oscillator device is provided with a crank component having its axle center forming an angle of no greater than 30° with an axle center of a crank arm, the axle center of the crank component, the axle center of the crank arm and the axle center of the main shaft are intersected at the same point, and an intersection angle between the axle center of the crank component and the axle center of the main shaft is fixed to 70°-110°; the oscillator device is provided with a connecting rod component connected with the main shaft, another end of the connecting rod component is rotationally connected with the crank component around the axle center of the crank arm, and the connecting rod component rotates around an axis vertical to the axle center of the main shaft and intersected with the axle center of the crank component within the scope of an angle twice as large as an intersection angle of the axle center of the crank component and the axle center of the crank arm; the oscillator device is provided with an eccentric component fixedly connected with the crank component, the eccentric component can alleviate vibration on the housing when the crank component and the connecting rod component rotate around the axle center of the crank component; the connecting rod component is provided with an elastic element and connected with the main shaft fixedly; the elastic element around an axle that is perpendicular to the axle center of the main shaft and intersects with the axle center of the crank component can produce bending deformation bigger than the intersection angle between the axle center of the crank component and that of the crank arm; the elastic element around the axle center of the main shaft cannot produce bending deformation bigger than the intersection angle between the axle center of the crank component and that of the crank arm.

2. The hand-held electric tool as recited in claim 1: wherein the angle of intersection between the axle center of the crank component and that of crank arm is no more than 5°; the main shaft is provided with elastic support; the elastic support is provided with inner ring and outer ring fixedly connected with the main shaft and the housing separately; the elastic support is also provided with several elastic elements, which fixedly connect the inner ring and the outer ring; when the main shaft oscillates around the axle center, the elastic support will exert torsion spring on the main shaft; when the axle centers of the crank component, the crank arm and the main shaft are on the same plane, the torsion spring exerted by the elastic support on the main shaft is zero.

* * * * *